May 18, 1954

C. T. O'HARROW 2,678,702

BEARING LUBRICATION

Filed Nov. 30, 1950

Inventor
Charles T. O'Harrow
by James O. Coffee
Attorney

May 18, 1954  C. T. O'HARROW  2,678,702
BEARING LUBRICATION

Filed Nov. 30, 1950  2 Sheets-Sheet 2

Inventor
Charles T. O'Harrow
by James D. Coffee
Attorney

Patented May 18, 1954

2,678,702

UNITED STATES PATENT OFFICE 2,678,702

BEARING LUBRICATION

Charles T. O'Harrow, Wauwatosa, Wis., assignor to Allis-Chalmers Manufacturing Company, Milwaukee, Wis.

Application November 30, 1950, Serial No. 198,343

5 Claims. (Cl. 184—6)

This invention relates to internal combustion engines and is more particularly directed to the lubrication of connecting rod bearings.

In the lubrication of connecting rod bearings in internal combustion engines there are two systems which are used rather extensively and these are classified broadly as "splash" and "pressure" systems, respectively. The general provisions of the two systems are well known by persons familiar with engine design and briefly, the "splash" designation is applied to systems wherein oil is directed to the bearing through the confines of the walls comprising the sides of the engine block, but essentially across a relatively unconfining air space, to contact the bearing surface at atmospheric pressure and with a force dependent on the condition of motion of the oil and/or bearing parts. The "pressure" designation is applied to systems wherein the oil is directed through the confines of walled passages and on to the bearing surface at the compulsion of a pump. In contrast to the "splash" system, the "pressure" system does not transmit oil across an unconfined air space.

The "splash" system of connecting rod lubrication has advantages in regard to control of engine wear and engine oil consumption which are generally recognized by those persons interested in engine design. However, a major problem is presented, particularly in the use of the "splash" system with high speed engines, in getting sufficient lubricant to the connecting rod bearing surface in face of the repelling action set up by the rotating crankshaft. The present invention is directed toward a solution of such problem.

And, accordingly, it is the object of this invention to provide structure, comprising a new and improved combination of an engine crankshaft and connecting rod, which is designed to utilize the dynamics of the connecting rod and crankshaft to establish a positive delivery of oil to the connecting rod bearing surface.

The construction and operation of apparatus embodying this invention will become more readily apparent as the disclosure progresses and particularly points out additional objects and advantages of special importance. And accordingly, the present invention may be considered as comprising the various constructions, combinations and/or subcombinations of parts as hereinafter more fully set forth in the detailed description and appended claims, reference being had to the accompanying drawings, in which:

Figure 1:
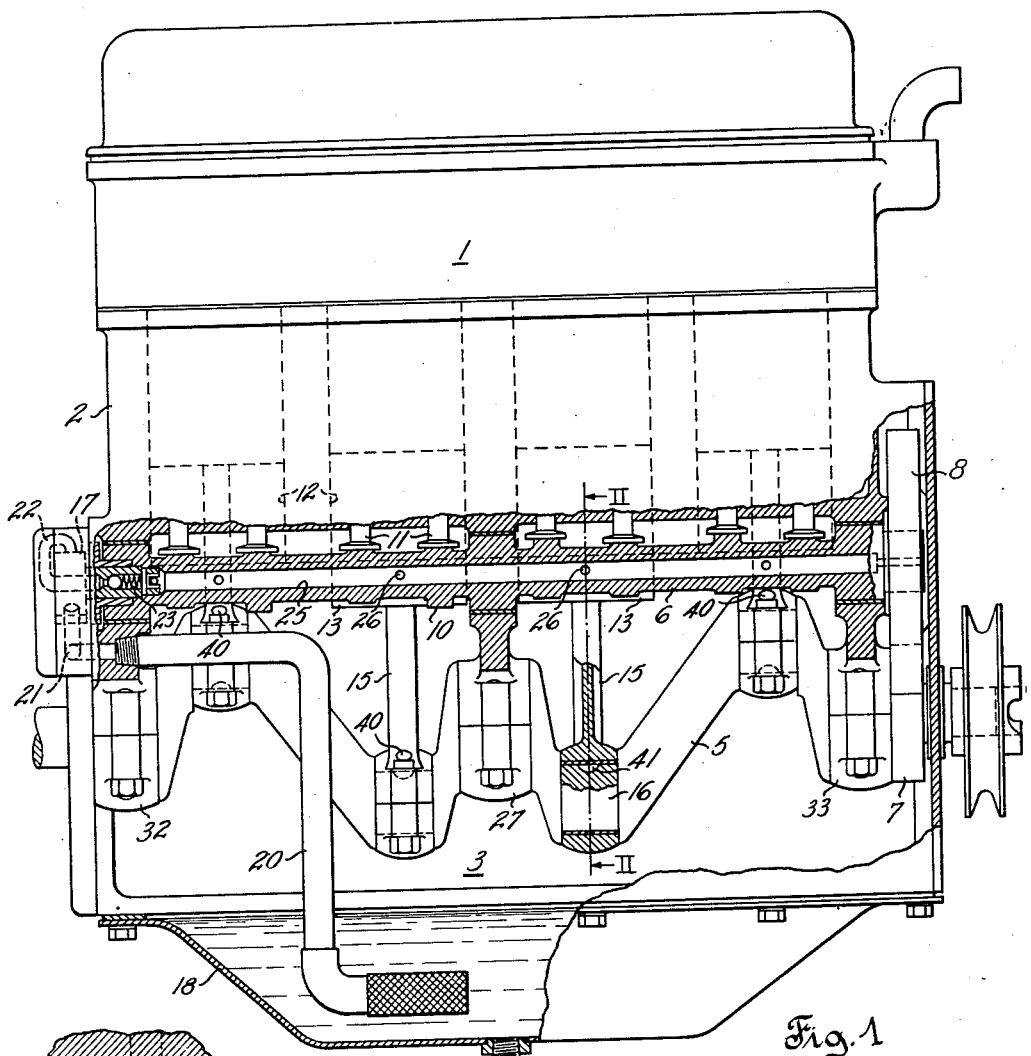
Fig. 1 is a side elevation of an internal combustion engine with portions broken away and in section to more clearly illustrate apparatus embodying the present invention.

Referring to Fig. 1 it is seen that apparatus embodying the present invention comprises an internal combustion engine 1 having a block portion 2 thereof forming a crankcase 3 and supporting opposite end portions of a crankshaft 5 for rotation relative thereto. A camshaft 6 is also rotatably supported by engine block 2 in vertically spaced, offset relation to the crankshaft, and a pair of constant mesh gears 7 and 8 nonrotatably fixed on adjacent end portions of the crankshaft and camshaft, respectively, afford means for driving the latter. Cam portions 10 along the camshaft operate in the usual manner to lift valve tappets 11. Engine block 2 includes cylindrical bores 12 having pistons 13 therein operatively connected through connecting rods 15 to journal portions 16 on the crankshaft to effect a rotary movement of the latter when the pistons are reciprocated within the cylinder bores. Since the engine is conventional in form and is not an essential part of the present invention, it is believed that a more detailed explanation of its structure and operation is unnecessary.

As a means for lubricating the various parts of the engine there is provided an oiling system comprising a pump 17 positioned at one end of camshaft 6 in driven relation thereto, a pan 18 attached to the lower portion of the engine block 2 and providing a sump or reservoir for a supply of oil, and intake conduit or pipe 20 which places the pump in communication with the reservoir. More specifically, pump 17 is a conventional rotary type pump having an inlet passage 21 leading from intake pipe 20 to the rotary element (not shown) and a discharge or outlet passage 22 which receives fluid under pressure and discharges same through a ball check valve controlled passage 23 in the pump body to a hollow center portion 25 of camshaft 6. Additional outlet passages (not shown) provide for lubricating parts of the engine which are not shown and with which the present invention is not concerned.

Passage 25 extends substantially the length of camshaft 6 and communicates with lateral passages 26 having openings at the outer surface of the camshaft and spaced therealong for alignment with journal portions 16 of the crankshaft. Consequently, a portion of the oil discharged from pump 17 into bore or passage 25 escapes through lateral passages 26 and is diffused into crankcase 3, generally in a series of planes normal to the crankshaft journal portions. Furthermore, it will be noted from Fig. 2 that the crankshaft center main bearing 27 receives lubrication through a lateral passage 28 in the camshaft and an inclined passage 30 in the camshaft center support 31. Similar means (not shown) are provided for lubricating the main bearings 32 and 33 (Fig. 1) at opposite ends of the crankshaft.

Figures 2, 7:
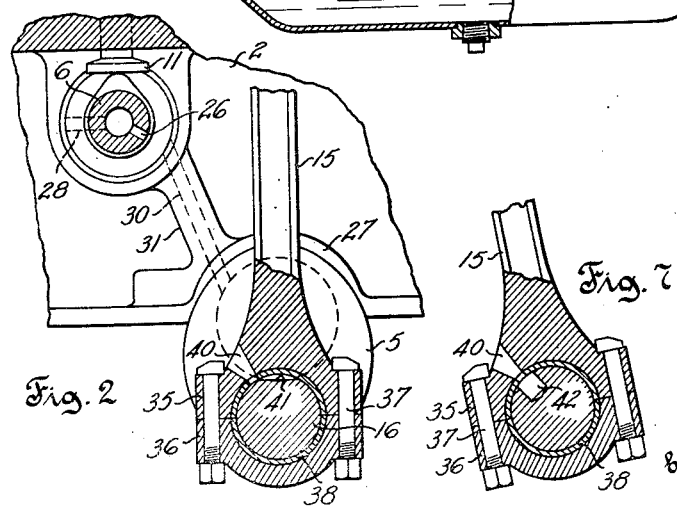
Fig. 2 is a view taken along line II—II in Fig. 1.
Fig. 7 is a view similar to Fig. 2, showing a modified form of the invention.
Figure 3:
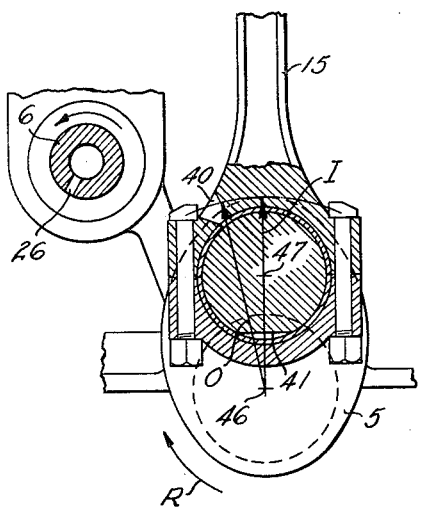
Figs. 3-6 are enlarged schematic illustrations of the connecting rod and crankshaft, shown in Figs. 1 and 2, in various portions of their cycle of movement, depicting the action of the dynamic forces on the oil being directed to the connecting rod bearing.
Figure 4:
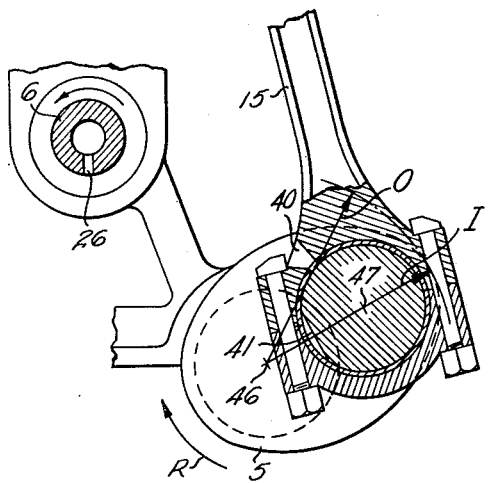

Referring also to Fig. 2 it is noted that connecting rod 15 comprises complementary bearing portions 35 and 36 held in place on journal portion 16 of crankshaft 5, as by bolts 37, and having a pair of semicylindrical complementary bearing shells 38 interposed between the bearing and the crankshaft. Upper bearing portion 35 and its shell or liner have an inclined passage 40 therethrough placing the peripheral portion of journal 16 in communication with crankcase 3. Inclined passage 40 is disposed on the side of the connecting rod facing opening 26 in camshaft 6 and is flared at its outer end. A portion of crankshaft journal 16 is drilled, or otherwise suitably machined, to provide a depression or recess 41 on the surface of the journal in position for communication with passage 40 during a portion of the cycle of rotation of crankshaft 5. And, although shown as having a rounded bottom surface, recess 41 may be in the form of a radial bore 42 as shown in Fig. 7 or any other configuration affording additional area on the crankshaft journal to receive oil through passage 40 in a manner to be described hereinafter. It will be noted, however, that in the preferred arrangement shown in Fig. 2 the chord formed by the intersection of the recess 41 and journal 16 is quite a bit longer than the diameter of the communicating opening through liner 38, thereby providing an oil receiving area on journal 16 which is relatively large with respect to the cross sectional area of the adjacent opening of passage 40.

In the operation of the above described lubricating system, pump 17 is driven by rotation of camshaft 6 and draws oil from sump 18 through intake passages 20 and 21 into the pump body and thence discharges the oil under pressure through outlet passage 22 into axial bore 25 of the camshaft. The oil thus pumped into camshaft 6 escapes through lateral passages 26 into the crankcase 3. The rotation of the camshaft, of course, imparts a centrifugal force to the oil which acts to throw the oil away from the camshaft during rotation and, consequently, oil coming out of each passage 26 forms a generally disk-like "sheet" surrounding the camshaft and generally normal to the longitudinal axis thereof.

The crankshaft 5 and connecting rods 15, during operation of the engine, are continuously moving through the path of the oil thrown from camshaft 6 and, consequently, a portion of such oil enters the passage 40 on the connecting rod, either directly or by moving down the connecting rod to the outer opening of the passage, and thus gets on to the surface of journal 16. And at relatively low speeds, about 2000 R. P. M. or less, there is retained on the surface of a journal not provided with a depression similar to recess 41 a sufficient quantity of the oil to properly lubricate the bearing throughout the cycle of crankshaft rotation. At higher engine speeds the oil thus fed to the journal bearing surface is inadequate and scored bearing surfaces occur.

Investigations have proven that the above mentioned deficiency in lubrication at the higher engine speeds is due largely to the reversal of flow through passage 40 as a result of the centrifugal force imparted to the oil by the rotation of crankshaft 5. This force is, of course, present at lower speeds but the effect thereof is not bothersome at the lower engine speeds since the bearing does not demand much lubrication.

The present invention was designed to utilize the aforementioned centrifugal force, created by the rotatiton of the crankshaft, to aid in properly lubricating the bearing surface of the crankshaft journals.

Looking now to Figs. 3–6 the coaction of recess 41 and passage 40 will be explained in conjunction with the centrifugal force imparted by the crankshaft to illustrate the action of structure embodying the present invention.

Crankshaft 5 rotates in a clockwise direction, designated by "R," about its axis of rotation and thus creates centrifugal forces emanating from axis 46. And, since the connecting rod journal portion of the crankshaft is offset with respect to the axis 46, centrifugal force of maximum intensity is effective in the direction of a radial line from the axis 46 through the axis 47, as indicated by the arrow I in Figs. 3 to 6. The point of maximum centrifugal intensity is the radially outer intersection point of arrow I with the cylindrical surface of journal 16, and the centrifugal force is less effective at any point on the journal which is closer to axis 46 than said radially outer intersection point. At a given surface point on the journal 16 which is displaced from said radially outer intersection point around the axis 47 the centrifugal force will progressively diminish as such given point approaches the axis 46 on the circumference of the journal 16. And in Figs. 3 to 6, arrow O is shown to indicate the direction in which the centrifugal force is effective at the intersection point of passage 40 with the cylindrical surface of journal 16, it being understood from the foregoing that the centrifugal force at said passage intersection point will be of lesser intensity than the maximum force at the radially outer intersection point of arrow I with the cylindrical surface of the journal.

Figure 5:
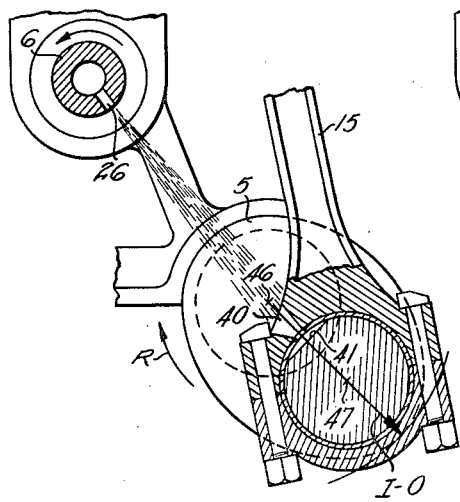
Figure 6:
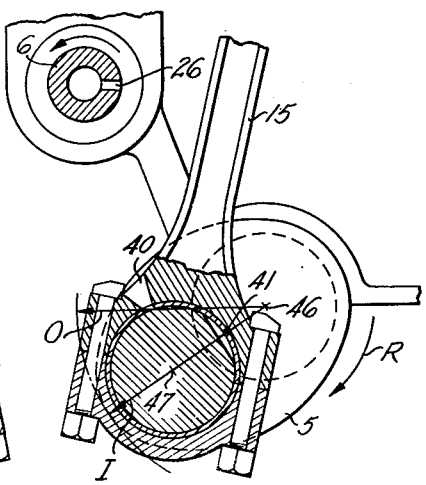

However, in Fig. 5 it is seen that the centrifugal force "O" is in generally the same direction as the axis of passage 40 and, therefore, any oil entering the passage is thrown toward journal 16. And to utilize this action the recess 41 is disposed so as to communicate with passage 40 at this portion of the cycle of rotation so that the oil flowing inwardly through passage 40 reaches a relatively large area of the bearing surface of the journal. Moreover, the oil thus delivered to the recess 41 will tend to remain there, due to the aforementioned centrifugal force, to lubricate the bearing during the remainder of the cycle of rotation. Thus it is seen in Fig. 5 that passage 40 will register with recess 41 when the crankshaft is rotated to a position in which a line, whose general direction is indicated by the arrows I and O which coincide in Fig. 5, extending from recess 41 radially of and beyond crankshaft axis 46 is generally directed toward conduit 26, the point of lubricant delivery. Fig. 6 shows the crankshaft in an advanced portion of its cycle, relative to that shown in Fig. 5, wherein the centrifugal force once more is beginning to throw oil out of and away from passage 40, although a small amount may find its way to the bearing due to being directed against the left hand or lower side wall of the passage as shown in the figure. It will be noted that recess 41 has moved away from passage 40 and, therefore, the oil directed thereto during the portion of the cycle shown in Fig. 5 will be trapped in the recess and will serve to lubricate the bearing throughout the remainder of the cycle of crankshaft operation.

Thus it is seen from the foregoing that the present invention comprises new and improved structural features of a connecting rod and crankshaft journal which are combined in a novel manner affording utilization of the dynamic forces present during the operation of the crankshaft to properly lubricate the journal bearing surfaces.

And, although shown and described with respect to the particular structure illustrated in the accompanying figures it is not intended to thereby limit the present invention, since other forms thereof within the scope of the appended claims may be readily apparent to those skilled in the art.

It is claimed and desired to secure by Letters Patent:

1. In an internal combustion engine having a rotatable crankshaft, and having a lubricating system including a conduit operative to deliver lubricant into the path of rotation of said crankshaft, the combination comprising a journal portion of said crankshaft having a depression formed in the outer surface and at the side thereof facing the axis of said crankshaft, and a connecting rod provided at one end with a bearing structure operatively surrounding said journal and having an opening therethrough adapted to register with said depression during a portion of each revolution of said crankshaft, said conduit being positioned to direct lubricant to said opening during said portion of each revolution of said crankshaft such that the line of action of the centrifugal force resulting from rotation of the crankshaft is generally in the same direction as the axis of said opening.

2. In an internal combustion engine having a rotatable crankshaft, a rotatable camshaft disposed in vertically spaced parallel relation to said crankshaft having a longitudinally extending passage therethrough and having a lateral passage placing said longitudinal passage in communication with the outer surface of said camshaft, a source of lubricant, means for transmitting lubricant from said source through said passages in said camshaft and into the path of rotation of said crankshaft, a crankshaft journal portion having a depression formed in the outer bearing surface and at the side thereof facing the axis of rotation of said crankshaft, and a connecting rod provided at one end with a bearing structure operatively surrounding said journal portion and having an opening therethrough adapted to register with said depression during a portion of each revolution of said crankshaft, said lateral camshaft passage being positioned to direct lubricant to said opening of said bearing structure during said portion of each revolution of said crankshaft such that the line of action of the centrifugal force resulting from rotation of the crankshaft is generally in the same direction as the axis of said opening.

3. In an internal combustion engine having a rotatable crankshaft, the combination comprising a crank journal having a recess formed in the outer surface thereof in facing relation to the axis of said crankshaft, a connecting rod provided at one end with a bearing structure operatively surrounding said journal, a lubricating system including a conduit operable to effect lubricant delivery radially of the axis of said crankshaft from a point in radially spaced relation to the latter, and a passage extending through said bearing structure at a point positioned circumferentially of the latter so that said passage and said recess will register with each other when said crankshaft is rotated to a position in which a line extending from said recess radially of and beyond said crankshaft axis is generally directed toward said point of lubricant delivery.

4. In an internal combustion engine having a rotatable crankshaft, the combination comprising a crank journal having a depression formed in the outer surface thereof in facing relation to the axis of said crankshaft, a connecting rod provided at one end with a bearing structure operatively surrounding said journal, a lubricating system including a conduit operable to deliver unconfined lubricant in a direction radially of the axis of said crankshaft from a point in horizontally and vertically spaced relation to the latter, and a lubricant passage extending through said bearing structure at a point offset circumferentially of said journal from the longitudinal axis of said connecting rod so that said passage and said recess will be in communication with each other when said crankshaft is rotated to a position in which a line extending from said depression radially of and beyond said crankshaft axis is generally directed toward said point of lubricant delivery.

5. In an internal combustion engine, the combination recited in claim 4, wherein said depression of said crank journal has an area greater than the cross sectional area of said passage through said connecting rod bearing structure.

References Cited in the file of this patent

UNITED STATES PATENTS

| Number | Name | Date |
|---|---|---|
| 1,245,257 | Miller | Nov. 6, 1917 |

FOREIGN PATENTS

| Number | Country | Date |
|---|---|---|
| 10,675 | Great Britain | of 1894 |
| 12,874 | Great Britain | of 1911 |
| 220,485 | Great Britain | Aug. 21, 1924 |
| 462,232 | France | Nov. 17, 1913 |